(12) United States Patent
Asano

(10) Patent No.: US 9,237,222 B2
(45) Date of Patent: Jan. 12, 2016

(54) MOBILE TERMINAL AND TERMINAL OPERATION PROGRAM

(71) Applicant: KYOCERA CORPORATION, Kyoto (JP)

(72) Inventor: Satoshi Asano, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/251,482

(22) Filed: Apr. 11, 2014

(65) Prior Publication Data

US 2014/0220956 A1 Aug. 7, 2014

Related U.S. Application Data

(63) Continuation of application No. 13/001,315, filed as application No. PCT/JP2009/061782 on Jun. 26, 2009, now Pat. No. 8,725,215.

(30) Foreign Application Priority Data

Jun. 26, 2008 (JP) ................................. 2008-167322

(51) Int. Cl.
*H04M 1/38* (2006.01)
*H04M 1/725* (2006.01)
*G06F 3/0488* (2013.01)
*H04W 4/00* (2009.01)

(52) U.S. Cl.
CPC ......... *H04M 1/72583* (2013.01); *G06F 3/0488* (2013.01); *H04M 1/72522* (2013.01); *H04M 1/72552* (2013.01); *H04W 4/003* (2013.01); *H04M 2250/22* (2013.01); *H04M 2250/56* (2013.01)

(58) Field of Classification Search
USPC .................................................. 455/566, 418
See application file for complete search history.

(56) References Cited

U.S. PATENT DOCUMENTS

| 6,195,570 B1 | 2/2001 | Ishida |
|---|---|---|
| 7,187,374 B2 | 3/2007 | Mori et al. |
| 2004/0201492 A1 | 10/2004 | Matsumoto |

(Continued)

FOREIGN PATENT DOCUMENTS

| JP | 10-207330 A | 8/1998 |
|---|---|---|
| JP | 11-231998 | 8/1999 |

(Continued)

OTHER PUBLICATIONS

International Search Report; PCT/JP2009/061782; Jul. 21, 2009.

(Continued)

*Primary Examiner* — Justin Lee
(74) *Attorney, Agent, or Firm* — Studebaker & Brackett PC

(57) ABSTRACT

An object of the present invention is to quickly and surely acquire icon information without passing through a plurality of hierarchies.
A mobile terminal 110 according to the present invention includes a display unit 214, a touch detection unit 218 that receives a user input onto a surface of the display unit, an operation unit 216 including a plurality of movable operation keys, and a guidance display unit that enters a guidance display mode upon detection of a depression of a predetermined movable operation key of the operation unit 216, and in the guidance display mode, upon detection of a user input onto an icon displayed on the display unit by the touch detection unit 218, displays on the display unit a predetermined guidance screen related to the icon.

4 Claims, 9 Drawing Sheets

(56) References Cited

U.S. PATENT DOCUMENTS

| | | |
|---|---|---|
| 2004/0242279 A1 | 12/2004 | Costanzo et al. |
| 2005/0076302 A1 | 4/2005 | Okamoto |
| 2008/0280588 A1 | 11/2008 | Roundtree et al. |
| 2009/0249247 A1* | 10/2009 | Tseng et al. ............... 715/808 |
| 2012/0216139 A1* | 8/2012 | Ording et al. ............... 715/773 |

FOREIGN PATENT DOCUMENTS

| | | |
|---|---|---|
| JP | 11-355602 A | 12/1999 |
| JP | 2000-137726 A | 5/2000 |
| JP | 2005-115462 A | 4/2005 |
| JP | 2006-172227 A | 6/2006 |
| JP | 2006-287556 A | 10/2006 |
| JP | 2006-323578 A | 11/2006 |
| JP | 2007-272840 A | 10/2007 |

OTHER PUBLICATIONS

Japanese Office Action; JP2008-167322; Mar. 19, 2012.
Japanese Office Action; JP2008-167322; Feb. 5, 2013.
Japanese Office Action; JP2013-105523; Nov. 5, 2013.
An Office Action; "Notice of Reasons for Rejection," issued by the Japanese Patent Office on Nov. 25, 2014, which corresponds to Japanese Patent Application No. 2013-265810 and is related to U.S. Appl. No. 14/251,482; with English language Concise Explanation.

* cited by examiner

FIG. 6

| ICON | NAME | EXPLANATION |
|---|---|---|
| | Signal | This icon indicates your current signal strength. The more lines you have, the stronger your signal. |
| | Voice Missed Calls | This icon indicates you have voice missed calls. |
| | New Email Messages | This icon indicates you have new Email massages waiting. |
| | Notification | This icon indicates you have received 2 or more different types of the following notifications: voice Missed Calls/Schedule alarm/Call Alarm Clock. |
| | Bluetooth: Connected | This icon indicates the handset is connected to Bluetooth device. |
| | Battery | This icon indicates the level of your battery charge. The more black you see, the more power you have left. |
| | 1 Beep & Vibrate | This icon indicates a beep sounds at the Level 1 instead of a ringer, in addition to the vibrate feature. |
| | TTY Mode | This icon indicates TTY is available. |
| | Car Kit | This icon indicates Car Kit device is set to ON. |

MOBILE TERMINAL AND TERMINAL OPERATION PROGRAM

TECHNICAL FIELD

The present invention relates to a mobile terminal and a terminal operation program capable of easily acquire information of a plurality of icons displayed on a display unit.

BACKGROUND ART

In recent years, mobile terminals such as portable telephones and PHS (Personal Handy phone System) terminals are widely spread, so that it is possible to make a call or to obtain information regardless of location or time. In particular, an amount of information that can be obtained is recently increased and a wireless communication method of high speed and high quality is adopted so as to download a large amount of data. As the information that can be handled and the amount and number of applications are increased, a help function for searching contents, functions and operating methods thereof is required. However, the mobile terminal has the limited number of input keys and the limited display area so as to keep the portability thereof and the operability of the help function itself is poor, so that it is not possible to provide sufficient search efficiency.

In order to improve the search efficiency by keywords, a technique has been disclosed in which after a key input operation is performed, a function explanation database is searched based on history of the key input operation and proper help information can be searched on the basis of keywords, which have been already input, without re-input of keywords (for example, Patent Document 1). In addition, a technique has been known in which when any information is searched using a help function, not only an input of a key or request sentence for search but also operation history is also considered to search help information that a user desires (for example, Patent Document 2).

In the meantime, the information of the contents, functions and operation methods can be typically referred to via a plurality of hierarchies (via selection items) from menu items. However, a user has to always pass through a plurality of hierarchies so as to refer to the information, so that the user is forced to have a troublesome operation and specialized knowledge. Accordingly, a technique has been also disclosed in which an operation screen, in which a plurality of menu items is arranged in order of using frequency while ignoring a hierarchy relation of items, is displayed so that the information, which has been once used, can be easily referred to from next time (for example, Patent Document 3). According to the technique, it is possible to easily select a desired function setting without repeating a complicated menu selecting operation.

PRIOR ART DOCUMENTS

Patent Documents

Patent Document 1: Japanese Patent Publication No. H11-231998

Patent Document 2: Japanese Patent Publication No. 2000-137726

Patent Document 3: Japanese Patent Publication No. 2006-287556

SUMMARY OF THE INVENTION

Problems to be Solved by the Invention

According to the mobile terminals as described above, in order to display a plurality of operation objects on a small display area, icons, which directly indicate the operation functions, are used. The icons include an icon that is arranged on a wait screen in addition to an icon for startup of a specific application. For example, the icons indicate a predetermined state such as icons indicating a remaining amount of a battery and a pictogram (received signal strength), an icon indicating reception of an e-mail, and the like.

With regard to the icon for startup of an application, the information thereof is shown in a relatively upper hierarchy. However, the above-described icon indicating a predetermined state can be barely reached via hierarchies such as three or four layers. In addition, it cannot be even guessed in many cases where the information of the icon indicating the predetermined state is originally stored. That is, according to the current mobile terminals, it is often difficult to reach the icons because the reference hierarchies by the icons are different or the selection items are varied.

Here, it can be considered to apply the conventional technique of increasing easiness of the selection, taking the using frequency into consideration. However, since those techniques assume that at least one search should be performed, it is not possible to realize the effect for the icons having the few times of reference, such as icon indicating a predetermined state.

In view of the above problems, an object of the present invention is to provide a mobile terminal and a terminal operation program capable of quickly and surely acquiring icon information by a simple operation without passing through a plurality of hierarchies.

Means for Solving the Problems

In order to solve the above problems, a representative configuration of a mobile terminal according to the present invention includes a display unit; a touch detection unit that receives a user input onto a surface of the display unit; an operation unit including a plurality of movable operation keys; and a guidance display unit that enters a guidance display mode upon detection of a depression of a predetermined movable operation key of the operation unit, and that in the guidance display mode, upon detection of a user input onto an icon displayed on the display unit by the touch detection unit, displays on the display unit a predetermined guidance screen related to the icon.

The guidance display mode may be kept while the predetermined movable operation key is in a depression state.

The guidance display mode may be kept until a predetermined time period elapses after detecting the depression of the predetermined movable operation key, and the guidance display mode is ended after the predetermined time period elapses.

The guidance display mode may be kept until the depression of the predetermined movable operation key is detected again.

The predetermined movable operation key may be commonly used for another function, and when a depression state of the predetermined movable operation key is kept for a predetermined time period or more, the guidance display unit may enter the guidance display mode.

The mobile terminal may further include an allotment change unit that changes the predetermined movable operation key to another movable operation key.

According to the present invention, the transition to the guidance display mode which is an operation mode of performing a guidance display is made just by depressing a predetermined movable operation key, which is arranged to be easily depressed, under a state where the touch detection unit can be touched. During the guidance display mode, touching on any icon is not an operation that is preset for the icon and uniformly displays a guidance screen related to the icon. Accordingly, regarding an icon indicating a predetermined state in which guidance of the icon is provided in a relatively deep hierarchy, it is possible to show the guidance of the icon by a simple operation without passing through a plurality of hierarchies. In addition, the display of the guidance screen is limited only when the predetermined movable operation key is depressed, for example. Thus, it is possible to suppress consumption of power or processing time, which is caused when always performing monitoring for proper response even though the guidance screen is not necessary.

The predetermined guidance screen may display information for specifying a content of the icon. The information for specifying the content of the icon is uniformly displayed as the guidance screen, so that a user can execute the guidance operation in a uniform way regardless of types or functional difference of the mobile terminal. Thus, the user can easily see desired information in familiar order without referring to a complicated instruction manual or function explanations.

The guidance display unit may display a guidance screen that guides a startup method of an application specified by the icon upon detection of a further user input onto the icon in the predetermined guidance screen.

According to the present invention, an icon indicating a predetermined state is also an object, and an application specified by the icon can be also started up. By the configuration of displaying the guidance screen of the startup method, it is possible to confirm presence of an application specified by the icon that is first touched and to quickly and easily confirm the startup method of the application without performing search therefor again.

The guidance screen guiding the startup method may show a startup icon for the application specified by the icon.

According to this configuration, it is possible to quickly and easily start up the related application without manually searching the application specified by the icon.

The mobile terminal may further include a history storage unit that stores a history of the predetermined guidance screen by the guidance display unit, the guidance display unit may enter the guidance display mode upon detection of a depression of the predetermined movable operation key, and wherein, in the guidance display mode, upon detection of a user input onto a predetermined history reference icon displayed on the display unit by the touch detection unit, the guidance display unit may display on the display unit the history of the predetermined guidance screen, and again display on the display unit the predetermined guidance screen selected from the history by a further user input.

When the predetermined movable operation key is depressed, the predetermined history reference icon is displayed on the display unit and the touching on the icon enables re-selection of the history that is operated in the guidance display mode in the past. According to this configuration, even when the depression keeping state of the movable operation key is abruptly stopped during the guidance display mode, the guidance display mode can be again executed to reproduce the previous operation state. Thus, it is possible to quickly and easily reach the desired guidance screen without passing through the troublesome operation input again.

Another representative configuration of the present invention provides a terminal operation program for operating a mobile terminal including a display unit, a touch detection unit that receives a user input onto a surface of the display unit and an operation unit including a plurality of movable operation keys, the program causes a control unit of the mobile terminal to execute: a step of detecting a depression of a predetermined movable operation key of the operation unit and a user input onto an icon displayed on the display unit by the touch detection unit; and a step of displaying a predetermined guidance screen related to the icon on the display unit.

The constitutional elements and explanations thereof based on the technical spirit of the mobile terminal can be applied to the terminal operation program.

Effects of the Invention

As described above, according to the present invention, it is possible to quickly and surely acquire icon information by a simple operation without passing through a plurality of hierarchies.

BRIEF DESCRIPTION OF THE DRAWINGS

FIG. 6 is an explanatory view illustrating a display example of a guidance screen.

DESCRIPTION OF EMBODIMENTS

Figure 1:
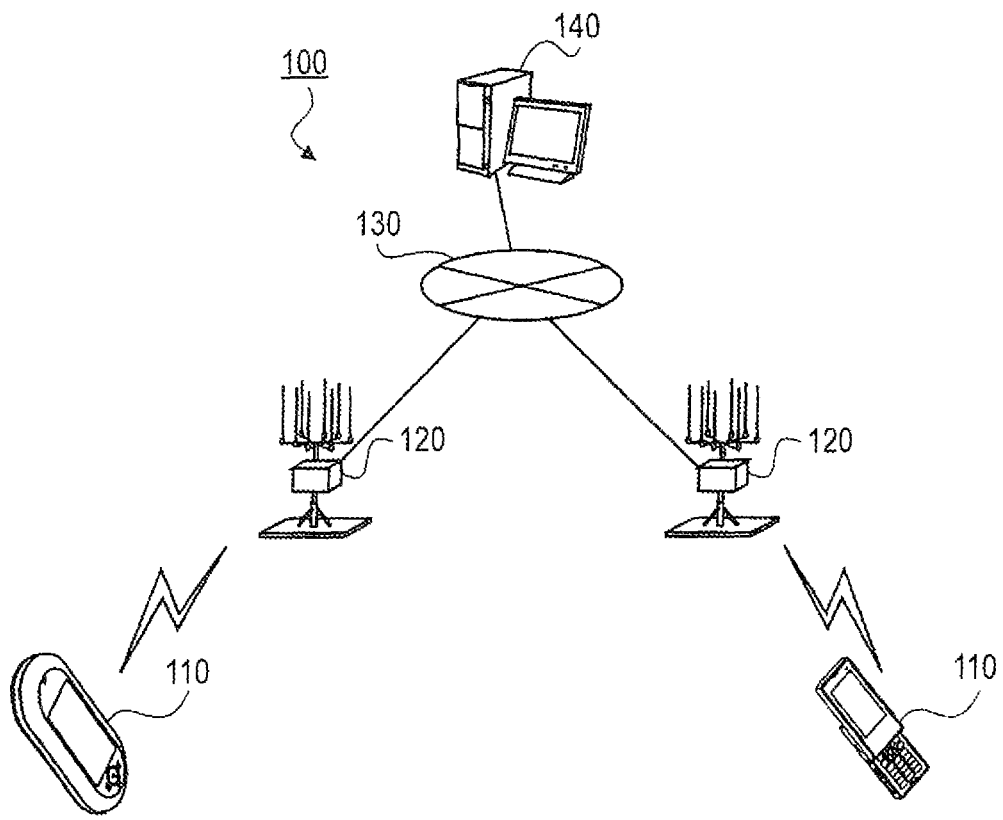
FIG. 1 illustrates a schematic connection relation of a wireless communication system.

Hereinafter, preferred embodiments of the present invention will be specifically described with reference to the drawings. The sizes, materials and other specific numerical values of the embodiments are exemplified so as to easily understand the invention and are not to limit the invention unless particularly mentioned otherwise. Meanwhile, in the specification and drawings, the elements having the substantially same functions and configurations are indicated with the same reference numerals and the overlapped explanations will be omitted. In addition, the elements that are not directly related to the invention will not be shown.

(Wireless Communication System 100)

FIG. 1 illustrates a schematic connection relation of a wireless communication system 100. The wireless communication system 100 includes a mobile terminal 110, base stations 120 that establish wireless communication with the mobile terminal 110, a communication network 130 that is connected to the base stations 120 and configured by ISDN (Integrated Services Digital Network) line, Internet, dedicated line or the like and a relay server 140 that relays the respective base stations 120 through the communication network 130.

In the wireless communication system 100, the mobile terminal 110 performs a call or communication with another mobile terminal 110 through the wireless communication with the base stations 120 and can be provided with a variety of services from Web servers of respective service providers connected through the communication network 130. In this embodiment, regarding an icon that appears upon reception of an email or reception of a missed call via the wireless communication system 100 and an icon that is arranged on a wait screen and indicates a remaining amount of a battery or a pictogram (received signal strength), when a user cannot know what the icons means only with the display of the icons, it is possible to acquire icon information by a simple operation. Hereinafter, a specific configuration of the mobile terminal 110 allowing a simple operation will be described and then a terminal operation method of the mobile terminal 110 will be specifically described.

(Mobile Terminal 110)

Figure 2:
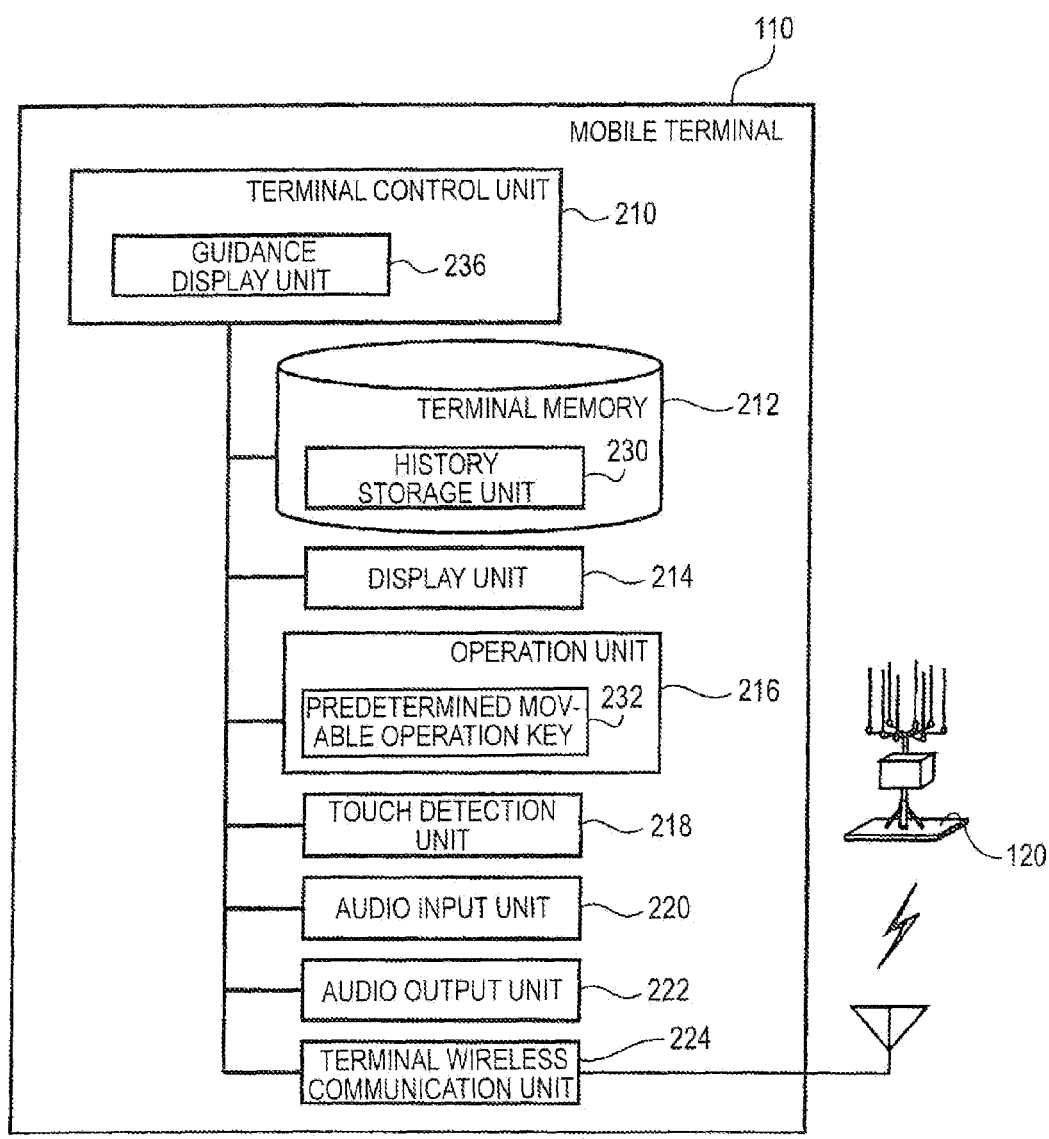
FIG. 2 is a function block diagram showing a hardware configuration of a mobile terminal.
Figure 3:
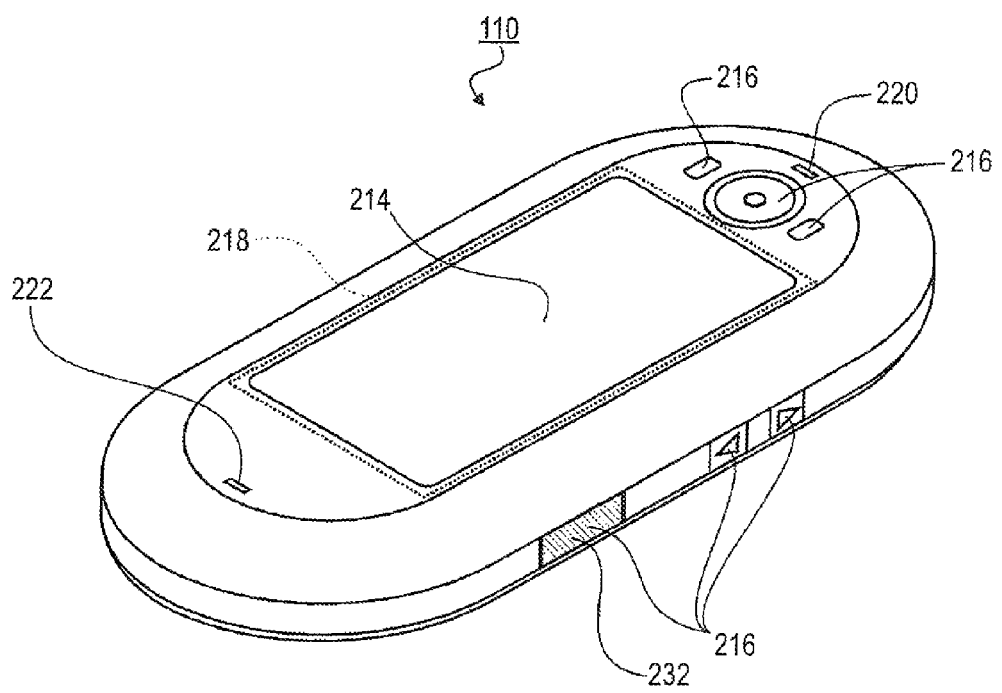
FIG. 3 is a perspective view showing an outward appearance of a mobile terminal.

FIG. 2 is a function block diagram showing a hardware configuration of the mobile terminal 110, and FIG. 3 is a perspective view showing an outward appearance of the mobile terminal 110. The mobile terminal 110 includes a terminal control unit 210, a terminal memory 212, a display unit 214, an operation unit 216, a touch detection unit 218, an audio input unit 220, an audio output unit 222 and a terminal wireless communication unit 224.

As the mobile terminal 110, a variety of electronic devices capable of performing wireless communication such as PHS terminal, note-type personal computer, PDA (Personal Digital Assistant), digital camera, music player, car navigation, gaming device, DVD player and the like can be employed.

The terminal control unit 210 manages and controls the mobile terminal 110 by a semiconductor integrated circuit including a central processing unit (CPU) and performs calling, mail transmitting and receiving, imaging, music reproducing and TV watching functions by using programs of the terminal memory 212. The terminal memory 212 is configured by a ROM, a RAM, an EEPROM, a von-volatile RAM, a flash memory, an HDD or the like and stores programs, communication data and the like that are processed by the terminal control unit 210. In addition, the terminal memory 212 serves as a history storage unit 230 that stores history of a predetermined guidance screen by a guidance display unit 236.

The display unit 214 is configured by a liquid crystal display, an EL (Electro Luminescence) or the like and can display Web content or GUI (Graphical User Interface) of an application that is stored in the terminal memory 212 or provided from a Web server through the communication network 130. In addition, in this embodiment, the display unit 214 can arrange a plurality of icons indicating applications at positions that can be touched by the touch detection unit 218, which will be described later, and can display an icon that indicates a remaining amount of a battery and a pictogram (received signal strength) and an icon indicating a predetermined state such as icon indicating reception of an e-mail.

The operation unit 216 is configured by a keyboard, a numerical key, and a plurality of movable operation keys (hardware keys) such as joystick or the like and receives an operation input of a user. In this embodiment, a predetermined operation key (side key) 232 of the operation unit 216, which is provided on a case side, is set as a transition trigger to a guidance display mode. While the predetermined movable operation key is depressed, the guidance display mode is kept. In this embodiment, the guidance display mode is kept by keeping depressing the movable operation key 232, so-called depression keeping state. However, various keeping operations can be applied. For example, the display mode may be kept until a predetermined time period elapses after depressing the predetermined movable operation key. Alternatively, the display mode may be kept until the movable operation key 232 is again depressed after the depressing. Although the predetermined movable operation key 232 may be a dedicated key, it is typically commonly used for other functions. Further, the predetermined movable operation key 232 is recognized as a function of this embodiment when it is depressed for a predetermined time period, for example 0.5 second or more. Herein, the side key that a user can easily depress is set as the predetermined movable operation key 232. However, the allotment of the predetermined movable operation key may be changed depending on using easiness of the user.

Figure 4:
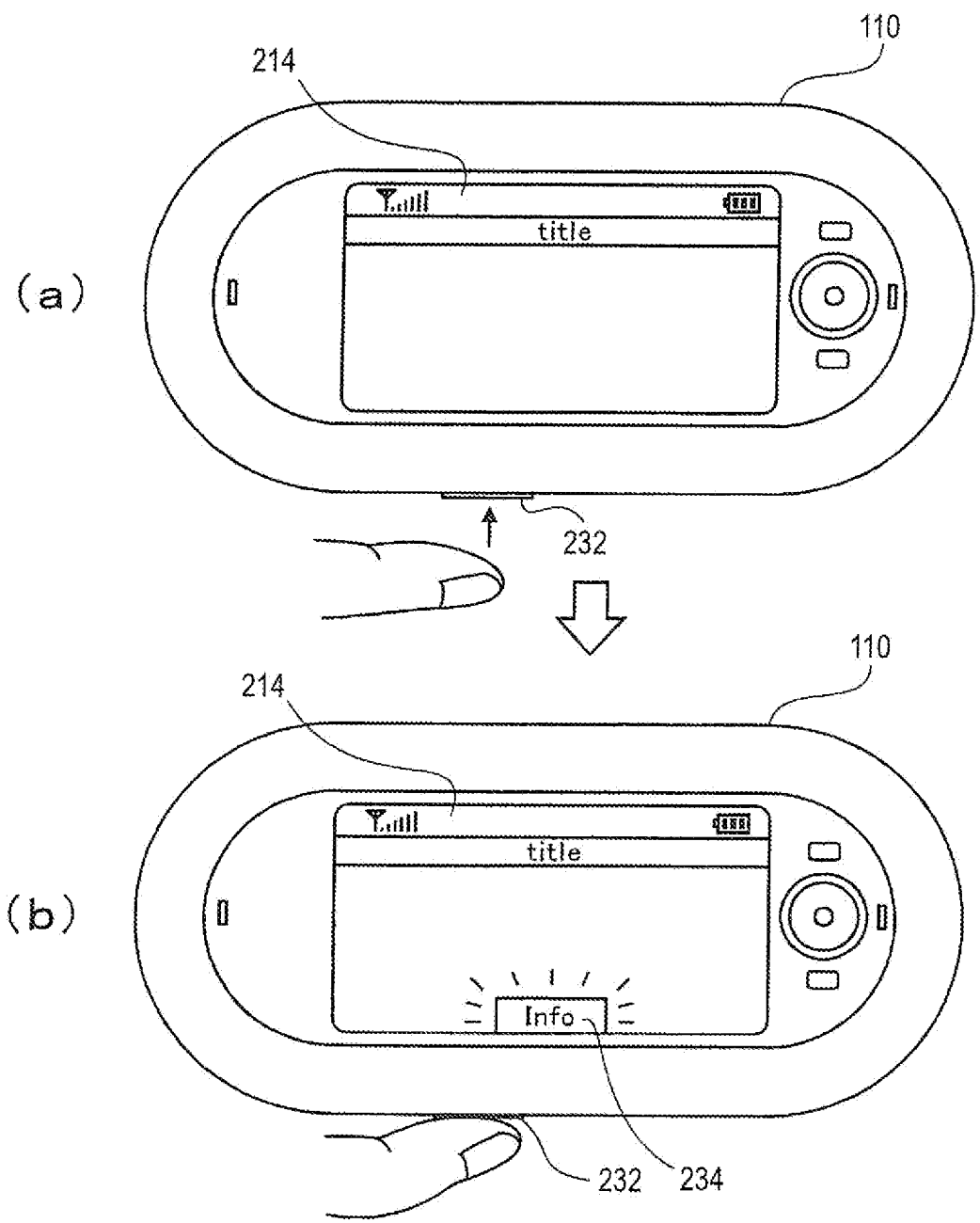
FIG. 4 is an explanatory view for explaining a predetermined movable operation key.

FIG. 4 is an explanatory view for explaining the predetermined movable operation key. Here, when the predetermined movable operation key 232 of the case side is depressed under wait state as shown in FIG. 4(*a*), a history reference icon 234 that is shown as 'Info' on the display unit 214 is displayed as shown in FIG. 4(*b*). The history reference icon 234 is continuously displayed while the user keeps depressing the predetermined movable operation key 232, and indicates that a current mode is the guidance display mode. When the user releases the depression keeping state of the predetermined movable operation key 232, the guidance display mode is ended and the mobile terminal returns to a general mode. In addition, when the history reference icon 234 is displayed on the wait screen in advance, the history reference icon 234 may blink on and off during the guidance display mode.

The touch detection unit 218 receives an operation input of a user corresponding to a display on a surface of the display unit 214. As a detection method of the touch detection unit 218, the conventional methods such as a resistance film method (pressure-sensitive method), an electrostatic capacity method, an infrared light-shielding method, a ultrasonic surface acoustic wave method, an electromagnetic induction method, an electrostatic coupling method, an acoustic pulse recognition method, an image recognition method or the like may be used. In addition, a method of recognizing an object placed on the surface of the display unit 214 by an optical sensor integrated to the display unit 214 is also within the technical scope of this embodiment.

By the touch detection unit 218, it is possible to receive a user's intuitive input corresponding to the screen of the display unit 214 without using the operation unit 216, for example. In addition, by the touch detection unit 218, it is possible to perform analog operations such as scrolling and pointing of the Web contents displayed on the display unit 214.

In general times (general mode), when the touch detection unit 218 detects touching on an icon indicating an application, the application is started up. When the touch detection unit detects touching on an icon indicating a remaining amount of a battery or icon indicating a predetermined state such as a pictogram, no operation is performed. However, when any icon is touched in the guidance display mode during which the predetermined movable operation key 232 is kept being depressed, a guidance screen is uniformly displayed. The detailed operation will be described below.

The audio input unit 220 is configured by audio recognition means such as microphone and the like and converts user's voice, which is input in making a call, into an electric signal that can be processed in the mobile terminal 110. The audio output unit 222 is configured by a speaker and converts and outputs an audio signal of a called party, which is received in the mobile terminal 110, into audio. In addition, the audio output unit can also output a ringtone, an operating sound of the operation unit 216 or touch detection unit 218, an alarm sound and the like.

The terminal wireless communication unit 224 establishes wireless communication with the base stations 120 through wireless communication methods such as CDMA (Code Division Multiple Access) and WiMAX (Worldwide Interoperability for Microwave Access) and performs voice communication with a called party or data communication with the Web server.

The terminal control unit 210 serves as a guidance display unit 236. The guidance display unit 236 displays on the display unit 214 a predetermined guidance screen related to an icon displayed on the display unit 214 upon detection of a user input of the icon via the touch detection unit 218 under state in which the predetermined movable operation key 232 of the operation unit 216 is kept being depressed, i.e., in the guidance display mode.

In this embodiment, transition to the guidance display mode is made just by keeping depressing the predetermined movable operation key 232 under state in which the touch detection unit 218 can be touched. During the guidance display mode, touching on any icon does not cause an operation that is preset for the icon and cause displaying a guidance screen related to the icon. Accordingly, regarding an icon indicating a predetermined state in which guidance of the icon is provided in a relatively deep hierarchy, it is possible to show the guidance of the icon by a simple operation without passing through a plurality of hierarchies.

Figure 5:
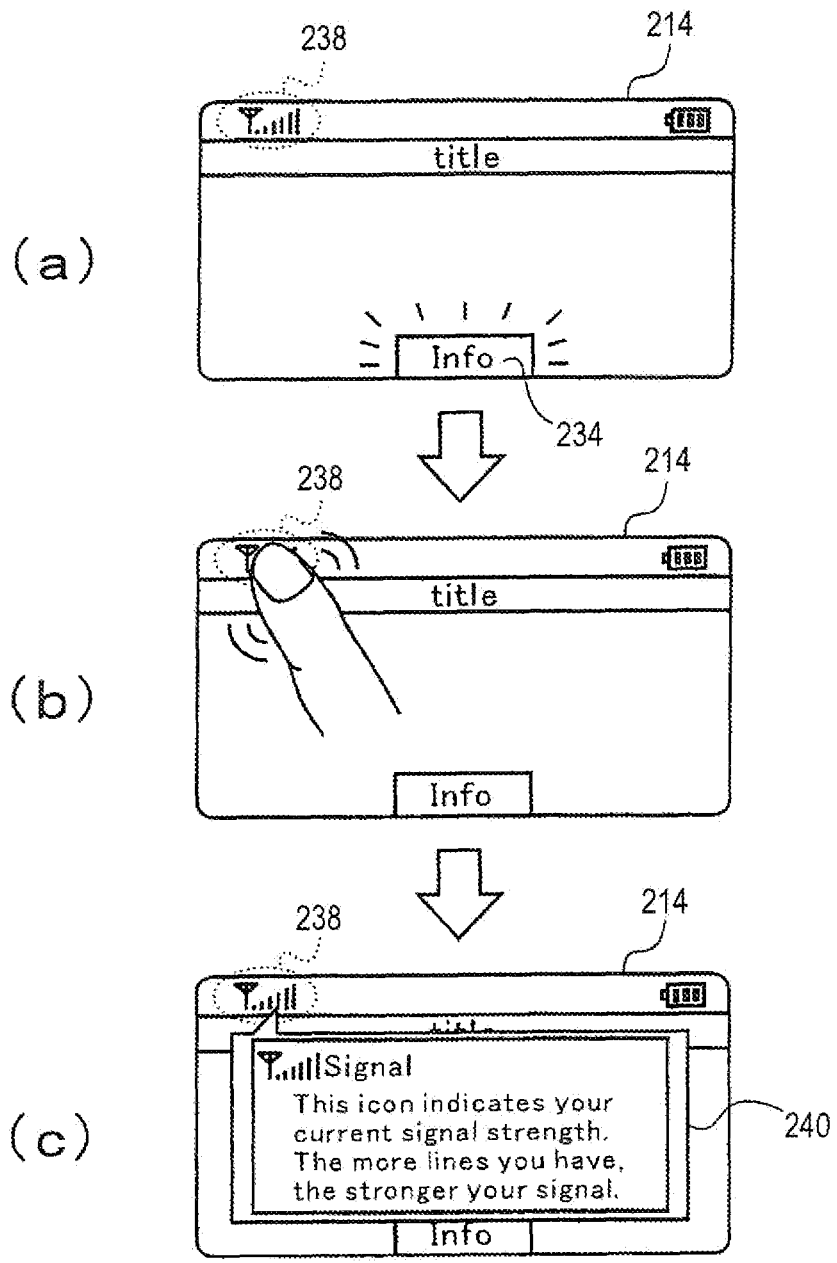
FIG. 5 is an explanatory view for explaining a guidance display mode.

FIG. 5 is an explanatory view for explaining the guidance display mode. Here, as a user keeps depressing the predetermined movable operation key 232, the transition to the guidance display mode is made as shown in FIG. 5(a). When the user additionally touches an icon 238 of the pictogram as shown in FIG. 5(b), a guidance screen 240 as shown in FIG. 5(c) is displayed. Here, as the guidance screen 240, information for specifying contents of the icon (icon 238 of the pictogram) is displayed.

That is, the information for specifying the contents of the icon is uniformly displayed as the guidance screen 240, so that a user can execute the guidance operation in a uniform way regardless of types or functional difference of the mobile terminal 110. Thus, the user can easily see desired information in familiar order without referring to a complicated instruction manual or function explanations.

The display of the guidance screen 240 by the guidance display unit 236 is limited only when the predetermined movable operation key 232 is depressed, for example. Thus, it is possible to suppress consumption of power or processing time such as unnecessary consumption of a memory or power, which is caused when always performing monitoring for proper response even though the guidance screen 240 is not necessary.

FIG. 6 is an explanatory view illustrating a display example of the guidance screen. Here, as information for specifying contents of icons, names and explanations of icons are shown.

In addition, the guidance display unit 236 displays on the display unit 214 a new guidance screen that guides a startup method of an application specified by an icon upon detection of a further user input onto the icon in the guidance screen 240.

Figure 7:
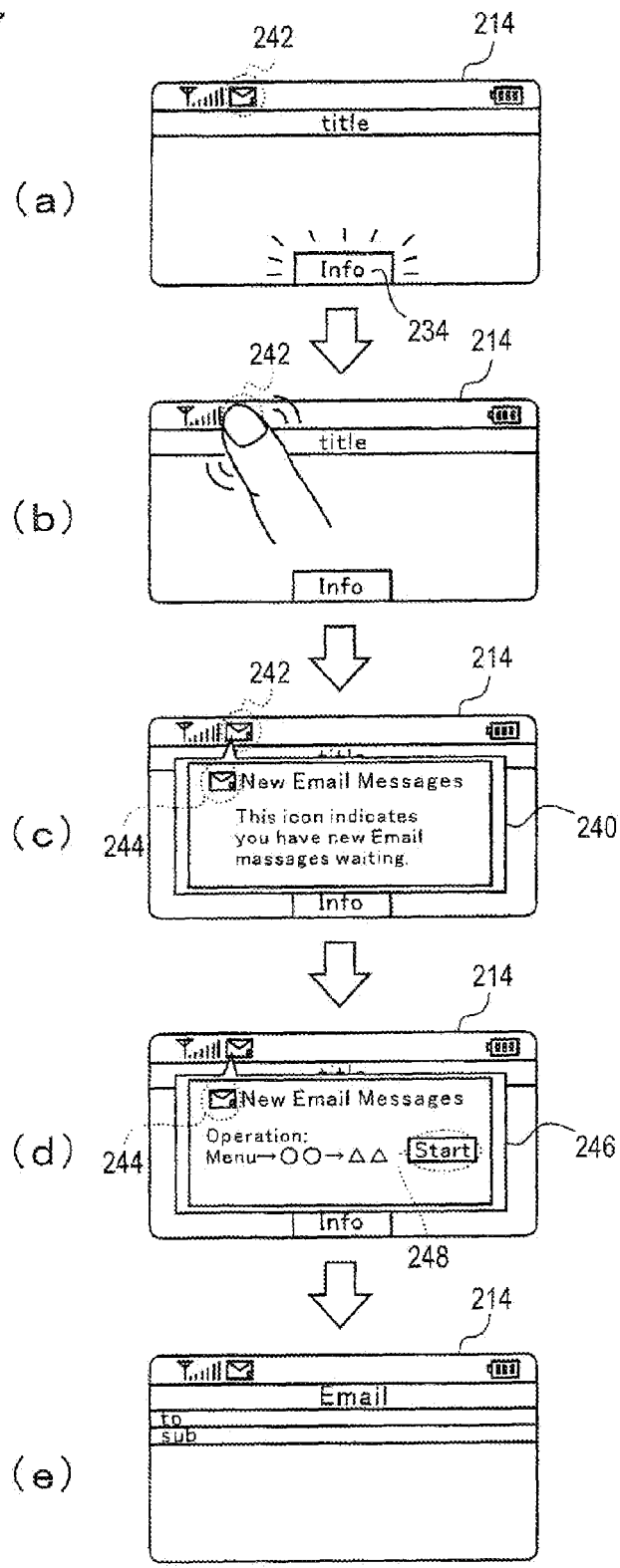
FIG. 7 is an explanatory view for explaining another example of the guidance display mode.

FIG. 7 is an explanatory view for explaining another example of the guidance display mode. Here, as a user keeps depressing the predetermined movable operation key 232, the transition to the guidance display mode is made as shown in FIG. 7(a). When the user touches an icon 242 indicating reception of an e-mail, as shown in FIG. 7(b), the guidance screen 240 as shown in FIG. 7(c) is displayed. Here, as the guidance screen 240, an icon 244 having the same design as the icon (icon indicating reception of an e-mail) 242 and information (for example, name or explanation of the icon) for specifying content of the icon 244 are displayed.

When an additional user input onto the icon 244 in the guidance screen 240 is detected, a guidance screen 246 as shown in FIG. 7(d) is displayed. Here, as the guidance screen 246, a startup method of an application specified by the icons 242, 244 are uniformly displayed. Thus, it is possible to start up an application specified by the icons 242, 244 according to the startup method.

By the configuration of displaying the guidance screen 246 of the startup method, it is possible to confirm presence of an application specified by the icon 242 that is first touched, as shown in FIG. 7(d). Furthermore, it is possible to quickly and easily confirm the startup method of the application without performing the search thereof again.

In addition, the guidance screen 246 that guides the startup method of FIG. 7(d) also displays a startup icon 248 of the application. When the startup icon 248 is touched, the e-mail application specified by the icon 242 is started up as shown in FIG. 7(e).

By the above configuration, it is possible to quickly and easily start up a related application without manually searching an application specified by an icon.

In addition, even when a user does not know how to start up an application while an object is to start up the application, the user can search a startup method and the startup icon 248 of an e-mail application which is an object, from the related icon, here the icon 242 indicating reception of an e-mail. Furthermore, since it is possible to simply execute the startup, the convenience and operability are improved.

In the meantime, the reference history of the guidance screen related to the icon 238 of the pictogram and the icon 242 indicating reception of an e-mail, which are described with reference to FIGS. 5 and 7, is appropriately stored in the history storage unit 230. The guidance display unit 236 displays, on the display unit 214, the history of the predetermined guidance screen, which is stored in the history storage unit 230, upon detection of a user input of the predetermined history reference icon 234 displayed on the display unit 214 in the guidance display mode.

Figure 8:
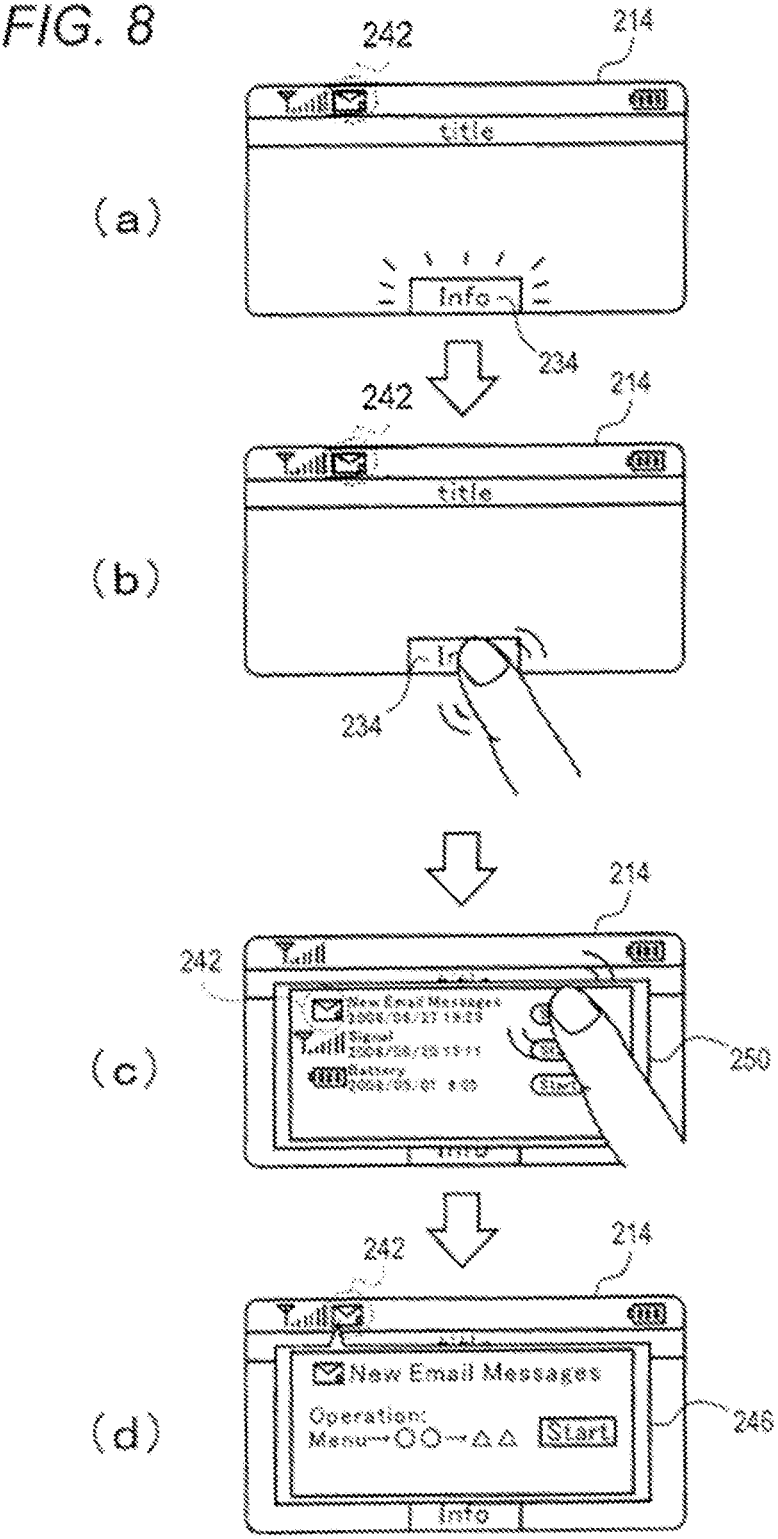
FIG. 8 is an explanatory view for explaining a further example of the guidance display mode.

FIG. 8 is an explanatory view for explaining a further example of the guidance display mode. Here, as a user keeps depressing the predetermined movable operation key 232, the transition to the guidance display mode is made as shown in FIG. 8(a). In the case where the guidance display mode has been used in the past, the history reference icon 234, which is shown as 'Info,' blinks on and off. When the history reference icon 234 that blinks on and off is touched as shown in FIG. 8(b), a guidance screen 250, in which reference history in the guidance display mode of the past is listed, is displayed as shown in FIG. 8(c), in response to the user input.

Furthermore, when one guidance screen is selected from the history reference by the user input, the selected guidance screen can be again displayed on the display unit 214. In the example of FIG. 8(c), since the guidance screen of the icon 242 of the e-mail application that is specified in the name of 'New Email Messages' is selected, the guidance screen 246 as shown in FIG. 7(d) that was referenced in the past is displayed.

Here, when the predetermined history reference icon 234 is touched in the guidance display mode, the history that has been operated in the guidance display mode in the past can be again selected. By this configuration, even when the depression keeping state of the predetermined movable operation key 232 is stopped, for example, when a mail or call is received and guidance by the guidance screen thereof is interrupted, it is possible to reproduce the previous operation state by re-executing the guidance display mode described above. Thus, it is possible to quickly and easily reach the desired guidance screen without passing through the troublesome operation input again.

As described above, according to the mobile terminal 110, it is possible to quickly and surely acquire the icon information by effectively using the display unit 214 and the intuitive touch detection unit 218, without passing through the plurality of hierarchies.

(Terminal Operation Method)

Next, a terminal operation method for operating the mobile terminal 110 will be described.

Figure 9:
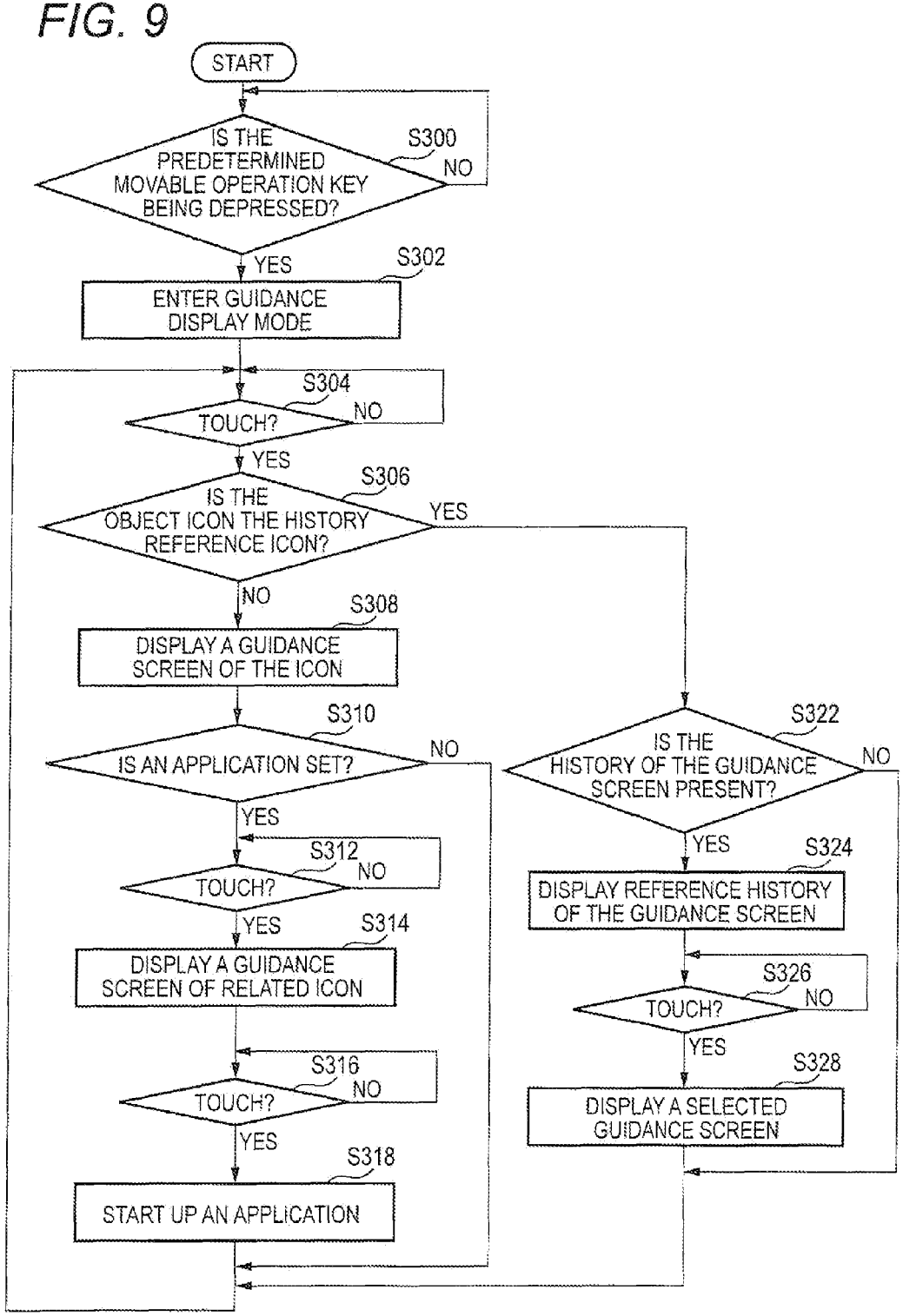
FIG. 9 is a flow chart showing an overall procedure of a terminal operation method.

FIG. 9 is a flow chart showing an overall procedure of the terminal operation method. The terminal operation method is a process that is executed by the terminal control unit 210 as the terminal control unit 210 executes a terminal operation program.

For example, when the depression state of the predetermined movable operation key 232 of the operation unit 216 is kept by the user under state in which the wait screen is displayed on the display unit 214 (S300), the operation mode of the mobile terminal 110 transits from the general mode to the guidance display mode (S302). Then, the history reference icon 234 is displayed on a part of the display unit 214. At this time, when the guidance display mode has been used in the past, i.e., when the reference history of the guidance screen is stored in the history storage unit 230, the history reference icon 234 is displayed with blinking on and off or its color being changed.

The guidance display mode is released when the depression keeping state of the predetermined movable operation key 232 is stopped. Accordingly, the operation of the predetermined movable operation key 232 becomes null even at any timing of the flow chart, so that the terminal operation method ends.

Here, when the user input onto an icon displayed on the display unit 214 is detected by the touch detection unit 218 (S304), it is determined whether the touched object icon is the history reference icon 234 (S306). When the icon is a general icon, rather than the history reference icon 234, the guidance display unit 236 displays a guidance screen of the designated icon (S308).

Then, it is determined whether an application is set for the designated icon (S310). When an application is set, the guidance display unit 236 waits for a user input onto the icon displayed on the display screen (S312), and displays a guidance screen of a startup method of the application and the startup icon 248 (S314). Here, when a user input onto the startup icon 248 is detected (S316), the application is started up (S318).

In the process (S306) of determining whether the designated icon is the history reference icon 234, when it is determined that the icon is the history reference icon 234 ('YES' in S306), it is determined whether reference history for the guidance screen is present (S322). When the reference history is present, the guidance display unit 236 lists the reference history of the guidance screen and displays it on the display unit 214 (S324). Then, the guidance display unit 236 waits for a selection input of the user onto the reference history (S326) and displays the selected guidance screen (S328).

According to this terminal operation method, it is possible to quickly and surely acquire the icon information by a simple operation without passing through the plurality of hierarchies that are provided in advance in the mobile terminal 110.

Although the preferred embodiments of the invention have been described with reference to the drawings, it should be noted that the present invention is not limited thereto and can be modified and changed by one skilled in the art within the scope of the claims, which are intended to be included in the technical scope of the present invention.

In the meantime, the respective steps of the terminal operation method are not necessarily performed time-serially in accordance with the procedures shown in the flow chart and may be performed in parallel or include processing by a subroutine.

This application is based on Japanese Patent Application No. 2008-167322 filed on Jun. 26, 2008, the disclosures of which are incorporated herein by reference.

INDUSTRIAL APPLICABILITY

The present invention can be applied to a mobile terminal that can easily acquire information about a plurality of icons displayed on a display unit and a terminal operation method thereof.

DESCRIPTION OF REFERENCE NUMERALS

110: mobile terminal
214: display unit
216: operation unit
218: touch detection unit
230: history storage unit
232: predetermined movable operation key
234: history reference icon
236: guidance display unit
248: startup icon

The invention claimed is:

1. A mobile terminal having at least a first application program, a first icon corresponding to the first application program, a second application program and a second icon corresponding to the second application program, the mobile terminal comprising:
   a display unit;
   an input detection unit that detects a user input;
   a history storage unit that stores a screen which relates to the first application program and is displayed on the display unit, as a first screen, and that stores a screen which relates to the second application program and is displayed on the display unit, as a second screen; and
   a control unit that when a first input is detected in a state where a third screen, which includes the first icon and is different from the first screen and the second screen, is displayed on the display unit, displays on the display unit a fourth screen including information on the first application program, the first icon, information on the second application program and the second icon, and that when a second input selecting the first application program from among a plurality of application programs in a state where the fourth screen is displayed, displays the first screen on the display unit identical to the first screen stored in the history storage unit and displayed on the display unit.

2. The mobile terminal according to claim 1,
   wherein the third screen includes the first icon, and
   wherein when the first input is detected in the state where the third screen including the first icon is displayed, the control unit displays on the display unit the first icon displayed on the third screen and the first icon displayed on the fourth screen.

3. The mobile terminal according to claim 1,
wherein the third screen includes the first icon, and
wherein when the first input is detected in the state where the third screen including the first icon is displayed, the control unit displays the first icon displayed on the fourth screen so as not to be overlapped with the first icon displayed in the third screen.

4. The mobile terminal according to claim 1,
wherein the input detection unit includes a touch panel that detects a touch by a user and an operation key which is different from the touch panel.

* * * * *